United States Patent [19]

Sekhar et al.

[11] Patent Number: 5,397,450
[45] Date of Patent: Mar. 14, 1995

[54] CARBON-BASED BODIES IN PARTICULAR FOR USE IN ALUMINIUM PRODUCTION CELLS

[75] Inventors: Jaminagesh A. Sekhar; James J. Liu, both of Cincinnati, Ohio

[73] Assignee: Moltech Invent S.A., Luxembourg, Luxembourg

[21] Appl. No.: 34,283

[22] Filed: Mar. 22, 1993

[51] Int. Cl.[6] .................... C25C 3/12; C04B 35/0(
[52] U.S. Cl. .................. 204/243 R; 204/294
 264/105; 252/503; 252/504; 252/50:
[58] Field of Search .............. 204/291, 290 R, 294
 264/105; 373/89; 313/327; 252/504, 508, 50:

[56] References Cited

U.S. PATENT DOCUMENTS

| | | | |
|---|---|---|---|
| 3,090,094 | 5/1963 | Schwartzwalder et al. | 25/15 |
| 3,097,930 | 7/1963 | Holland | 25/15 |
| 3,111,396 | 11/1963 | Ball | 25/15 |
| 3,345,440 | 10/1967 | Googin et al. | 264/2 |
| 3,705,791 | 12/1972 | Bredzs | 29/19 |
| 3,726,643 | 4/1973 | Merzhanov et al. | 423/40 |
| 3,778,249 | 12/1973 | Benjamin et al. | 25/0.5 B( |
| 3,893,917 | 7/1975 | Pryor et al. | 210/6 |
| 3,947,363 | 3/1976 | Pryor et al | 210/51( |
| 3,962,081 | 6/1976 | Yarwood et al. | 210/69 |
| 4,024,056 | 5/1977 | Yarwood et al. | 210/69 |
| 4,081,371 | 3/1978 | Yarwood et al. | 210/69 |
| 4,217,948 | 8/1980 | Merzhanov et al. | 164/115 |
| 4,257,810 | 3/1981 | Narumiya | 106/42 |
| 4,258,099 | 3/1981 | Narumiya | 428/311 |
| 4,342,637 | 8/1982 | Withers et al. | 204/291 |
| 4,374,761 | 2/1983 | Ray | 252/519 |
| 4,391,918 | 7/1983 | Brockmeyer | 501/127 |
| 4,405,433 | 9/1983 | Payne | 204/225 |
| 4,455,211 | 6/1984 | Ray et al. | 204/293 |
| 4,459,363 | 7/1984 | Holt | 501/96 |
| 4,517,037 | 5/1985 | Francis et al. | 204/243 R |
| 4,596,637 | 6/1986 | Kozarek et al. | 204/67 |
| 4,600,481 | 7/1986 | Sane et al. | 204/67 |
| 4,613,375 | 9/1986 | Förster et al. | 106/281 R |
| 4,670,201 | 6/1987 | Montgomery et al. | 264/105 |
| 4,670,407 | 6/1987 | Kiehl et al. | 501/87 |
| 4,678,548 | 7/1987 | Brown | 204/67 |
| 4,678,760 | 7/1987 | Ray | 501/96 |
| 4,680,094 | 7/1987 | Duruz | 204/67 |
| 4,697,632 | 10/1987 | Lirones | 164/369 |

(List continued on next page.)

FOREIGN PATENT DOCUMENTS

| | | |
|---|---|---|
| 0126555 | 11/1984 | European Pat. Off. . |
| 0192602 | 8/1986 | European Pat. Off. . |
| 0404943 | 1/1991 | European Pat. Off. . |
| 1173804 | 3/1959 | France . |
| 3802670 | 8/1989 | Germany . |
| 1177829 | 1/1970 | United Kingdom ............. 204/294 |

OTHER PUBLICATIONS

J. W. McCauley et al. "Simultaneous Preparation . . .", Ceramic Engineering, 3 (1982), pp. 538–554.
R. W. Rice et al., "Effects of Self-Propagating . . . " Ceramic Engineering, 7 (1986), pp. 737–749.
H. C. Yi, Journal Materials Science, 25 (1990) pp. 1159–1168.
C. H. Samans "Powder Metallurgy", American Society For Metals, Metals Handbook, 1948, pp. 47–52.

*Primary Examiner*—Kathryn Gorgos
*Attorney, Agent, or Firm*—Frost & Jacobs

[57] ABSTRACT

A carbon containing material for use in particular as an anode of electrolytic cells for the production of aluminum by the electrolysis of alumina in a cryolite-based electrolyte, consists substantially of a mixture of one or more particulate carbonaceous material(s) with a binder based on compounds of aluminum with carbon, oxygen and/or nitrogen, such as aluminum carbide or aluminum oxycarbide, or such compounds mixed with aluminum. This binder is obtained by mixing the particulate carbonaceous material(s) with particulate aluminum and with at least one lithium compound and/or with at least one aluminum compound in a liquid carrier, and heat treating to form the binder. The liquid carrier may comprise a binding agent selected from methyl cellulose, polyvinyl alcohol and colloidal suspensions, in particular colloidal alumina.

66 Claims, No Drawings

U.S. PATENT DOCUMENTS

| | | | |
|---|---|---|---|
| 4,699,763 | 10/1987 | Sinharoy et al. | 419/11 |
| 4,710,348 | 12/1987 | Brupbacher et al. | 420/129 |
| 4,747,873 | 5/1988 | Kamioka | 75/229 |
| 4,751,048 | 6/1988 | Christodoulou et al. | 420/129 |
| 4,772,452 | 9/1988 | Brupbacher et al. | 420/129 |
| 4,774,052 | 9/1988 | Nagle et al. | 420/129 |
| 4,800,065 | 1/1989 | Christodoulou et al. | 420/129 |
| 4,808,372 | 2/1989 | Koczak et al. | 420/457 |
| 4,836,982 | 6/1989 | Brupbacher et al. | 420/129 |
| 4,865,701 | 9/1989 | Beck et al. | 204/67 |
| 4,900,698 | 2/1990 | Lundsager | 501/80 |
| 4,902,457 | 2/1990 | Wada et al. | 264/43 |
| 4,904,424 | 2/1990 | Johnson | 264/566 |
| 4,909,842 | 3/1990 | Dunmead et al. | 75/236 |
| 4,915,903 | 4/1990 | Brupbacher et al. | 429/128 |
| 4,915,905 | 4/1990 | Kampe et al. | 420/418 |
| 4,919,771 | 4/1990 | Wilkening | 204/67 |
| 4,948,676 | 8/1990 | Darracq et al. | 428/539 |
| 4,948,761 | 8/1990 | Hida | 501/89 |
| 4,957,885 | 9/1990 | Hida | 501/89 |
| 4,961,778 | 10/1990 | Pyzik et al. | 75/230 |
| 4,965,044 | 10/1990 | Miyamoto et al. | 419/12 |
| 4,975,191 | 12/1990 | Brockmeyer et al. | 210/510 |
| 4,985,202 | 1/1991 | Moshier et al. | 420/590 |
| 4,988,480 | 10/1991 | Merzhanov et al. | 419/11 |
| 4,990,295 | 2/1991 | Hida | 264/65 |
| 5,006,290 | 4/1991 | Hida | 264/65 |
| 5,015,343 | 5/1991 | LaCamera et al. | 204/67 |
| 5,022,991 | 6/1991 | Day et al. | 210/506 |
| 5,030,600 | 7/1991 | Hida et al. | 501/98 |
| 5,032,332 | 7/1991 | Hida et al | 214/65 |
| 5,071,533 | 12/1991 | de Nora et al. | 204/243 |
| 5,071,797 | 12/1991 | Hida | 501/87 |
| 5,110,427 | 5/1992 | Meyer | 204/67 |
| 5,143,668 | 9/1992 | Hida | 264/63 |
| 5,145,619 | 9/1992 | Abramovici | 264/60 |
| 5,149,677 | 9/1992 | Merzhanov et al. | 501/96 |
| 5,158,655 | 10/1927 | Townsend | 204/67 |
| 5,188,678 | 2/1993 | Sekhar et al. | 148/514 |
| 5,217,583 | 6/1993 | Sekhar et al. | 204/67 |

CARBON-BASED BODIES IN PARTICULAR FOR USE IN ALUMINIUM PRODUCTION CELLS

FIELD OF THE INVENTION

The invention relates to carbon-based bodies for use in particular as anodes in cells for the production of aluminium by the electrolysis of alumina dissolved in cryolite-based molten electrolytes. The invention also covers a paste from which such bodies may be made, and methods of manufacturing the bodies, and their application in particular as anodes for aluminium production.

BACKGROUND OF THE INVENTION

Aluminium is produced by the electrolysis of alumina dissolved in a cryolite-based molten electrolyte. The electrolytic cell known as the Hall-He,acu/e/ roult cell, uses anodes consisting of a compacted mixture of petroleum coke and pitch.

Although significant technological refinements in the cell design and construction have been made, the basic process of producing aluminium still remains substantially similar to what it was one hundred years ago.

The carbon anode blocks are consumed during electrolysis and must be replaced every four or five weeks of operation in standard cells. The oxygen resulting from the decomposition of alumina burns the carbon anode at a theoretical rate of approximately 330 kg per ton of aluminium produced, but in practice the carbon consumption is about 450 kg per ton of aluminium due to side reactions. This results in the emission of carbon oxides, sulfur oxides and other undesirable gases which are now being recognized as major atmosphere pollutants, but such emissions are considerably less dangerous and less polluting than those produced during fabrication of the carbon anodes with pitch as a binder.

At present, the method of producing carbon blocks to be used as anodes in aluminium production cells consists of mixing petroleum coke with pitch followed by compacting and calcining. Calcining designates a baking process in which volatiles are driven off at high temperatures without fusing the material.

The fabrication of the carbon anodes involves the use of pitch. During fabrication, gases are emitted especially from the pitch during the long period required for calcining the blocks. These gases are polluting and very dangerous to the environment and are recognized as a major hazard to the health of workers involved in the production.

The pitch serves as the binder for the dry mixture of carbonaceous materials. Unfortunately, the pitch binder presents a series of serious hazards for health and for the environment.

Both solid and liquid pitch is used. The utilization of solid pitch results in unsatisfactory working conditions for the workmen, such as irritation and itching of the skin and eyes, and special precautions must be taken in order to protect the workmen during all operations where pitch is involved.

Additional problems result from the utilization of liquid pitch, particularly in regard to the storage and transportation to the utilization plant.

During the calcining of the carbon blocks, which is required to eliminate the volatile components and stabilize the blocks, there is an emission of aromatic polycyclic hydrocarbons (PAH), which are very dangerous to the health and special equipment is required to absorb these products. However, the residual products after absorption are also difficult to eliminate and the cost of disposal is high.

Utilization of pitch as a binder requires the mixing operations with carbonaceous materials to be carried out at about 150°-200° C. and this creates operating complications and high operating costs.

The calcining process is complicated and costly and large furnaces are required which are difficult to operate, are polluting and expensive because of the high energy consumption. On account of the requirement of low thermal gradients during heating of these blocks to over 1000° C. and later cooling, the calcining operation normally takes as long as 2 to 4 weeks.

An additional disadvantage of the pitch is due to the fact that when the blocks are calcined the pitch is transformed mainly into a form of carbon which oxidizes more rapidly than the petroleum coke. This leads to disintegration of the anode block with formation of unutilized carbon powder which is detrimental to the operation of the electrolytic cell and increases the carbon consumption.

It would, therefore, be extremely advantageous for the aluminium industry to produce carbon blocks fabricated with a non-polluting binder without the necessity of handling pitch or like dangerous materials, avoiding the emission of polluting substances. Additionally, there is a need to develop compositions and methods which eliminate the high temperature fabrication and the long calcining times required to form the carbon blocks following the current state of the art.

U.S. Pat. No. 4,613,375 describes a carbon paste for self-calcining electrodes based on 70–90 wt % hard bitumen and 10–30 wt % soft bitumen to which was added up to 2 wt % of additives including aluminium and alumina. Though bitumen contains less polycyclic aromatic hydrocarbons than pitch, these bitumen-based materials have not found acceptance.

U.S. Pat. No. 4,919,771 discloses a Söderberg anode paste or a bipolar electrode made of a mixture of carbon and alumina containing about 85 wt % alumina and 15 wt % of pitch. Because of the high electrical resistivity of this material, it was proposed to use auxiliary electrodes of synthetic graphite, but these proposals have not been proven in practice.

U.S. Pat. No. 5,110,427 describes making use of scrap plastic coated aluminium foil by grinding it and including it in a carbon anode used for aluminium production by adding the ground scrap to the usual carbon-containing masses. This, however, still requires the usual pitch binders and addition of the scrap increased the resistivity of the anode.

Co-pending application Ser. No. 07/897,726 describes a carbon containing paste for use in particular as components of electrolytic cells as such or compacted to form anodes, cathodes and cell linings of cells for the electrolysis of alumina for the production of aluminium, which consists of a compact mixture of one or more particulate carbonaceous material(s) with a non-carbonaceous non-polluting binder and optionally with one or more fillers. The binder is a suspension of one or more colloids or colloid precursors or colloid reagents optionally with one or more chelating agents. Cell components are produced by forming the paste to a desired shape and size, for instance in a mold, an injection die or in a cell bottom, compacting and drying before use, or the paste can be used as such like in a Söderberg type anode, or for bonding together carbon blocks like a ramming paste. Among various possible additives are alumina and aluminium. This approach is promising especially as regards pollution reduction in the manufacturing process, but improvements are still desirable in materials obtained.

SUMMARY OF THE INVENTION

This invention aims to eliminate the use of pitch or to at least drastically reduce the dangerous and consequently damaging emission of gases during the traditional fabrication and calcining of carbon blocks, while at the same time employing aluminium as binder in an effective fashion so as to improve the material's resistance to oxidation substantially, and increase its service life. The invention also aims to provide a carbon based material that is wettable by molten cryolite thereby substantially improving the material's performance when used as anode in an aluminium production cell.

One main aspect of the invention is a carbon containing body for use in particular as pre-baked anode for the electrolysis of alumina dissolved in a cryolite-based molten electrolyte for the production of aluminium in Hall-Héroult cells, though use of Söderberg-type anodes is also contemplated. The body according to the invention consists substantially of a mixture of one or more particulate carbonaceous material(s) in a binder of at least one compound of aluminium with at least one of carbon, oxygen and nitrogen, or mixtures of at least one such compound with metallic aluminium, obtained by mixing a particulate carbonaceous material with aluminium and with at least one compound of aluminium, lithium, cerium, calcium and sodium in a liquid carrier, and compacting and heat treating such mixture to bond the carbonaceous materials with said binder.

The binder preferably comprises at least one of aluminium carbide, aluminium oxycarbide, aluminium nitride and aluminium oxynitride or mixtures thereof with metallic aluminium.

Excellent results have been obtained when the starting mixture includes at least one aluminium compound with at least one compound of the other metals, in particular lithium.

The aluminium compound is preferably a salt or other soluble compound, but some insoluble compounds can also be used. Soluble compounds include aluminium nitrate, carbonate, halides and borate. Insoluble aluminium carbide can also be used.

The lithium compound may be lithium acetate, lithium carbonate, lithium fluoride, lithium chloride, lithium oxalate, lithium nitride, lithium nitrate, lithium formate and lithium aryl, lithium tetraborate and mixtures thereof.

Preferably, at least one of the aforementioned lithium compounds is used together with at least one of the aforementioned aluminium compounds.

These salts of other compounds react together and with the carbon and aluminium to form aluminium oxycarbide and/or aluminium carbide $Al_4C$ which act as an oxidation-resistant and electrically-conductive binder for the carbon and contribute to the great oxidation resistance of the material and make it wettable by molten cryolite. Altogether, the addition of these compounds, in particular lithium and aluminium salts, greatly increases the stability of the material in the environment of an aluminium production cell.

The liquid carrier may be water or, advantageously, a colloid, in particular colloid alumina, or other compounds such as methyl cellulose or polyvinyl alcohol which assist to bind the green material before firing. Other useful colloids include colloidal silica, yttria, ceria, thoria, zirconia, magnesia, lithia and related hydroxides, acetates and formates thereof, as well as oxides and hydroxides of other metals, cationic species and mixtures thereof.

Colloids can also be derived from a suspension containing colloid precursors and reagents which are solutions of at least one salt such as chlorides, sulfates, nitrates, chlorates, perchlorates or metal organic compounds such as alkoxides, formates, acetates of silicon, aluminium, yttrium, cerium, thorium, zirconium, magnesium, lithium and other metals and mixtures thereof. Such solutions of metal organic compounds, principally metal alkoxides, may be of the general formula $M(OR)_z$ where M is a metal or complex cation made up of two or more elements, R is an alkyl chain and z is a number, usually in the range 1 to 12. Such metal organic compounds are alternatively described as solutions whose molecules have organic groups bound to a metal atom through oxygen. Examples are silicon tetraisomyloxide, aluminum butoxide, aluminum isopropoxide, tetraethyl orthosilicates, etc. Formates, acetates and acetylacetonates are also considered in this category.

The colloid will usually be a relatively dilute aqueous or non-aqueous suspension, but the use of concentrated colloids or partly or fully precipitated colloids is also possible.

Alternatively, the colloid is derived from a suspension containing also chelating agents such as acetyl acetone and ethylacetoacetate.

For the production of anodes in aluminium production cells, the material of the invention advantageously comprises one or more fillers selected from antioxidant or oxidation prevention materials such as boric acid and its salts, and fluorides, or from bonding enhancing materials such as methyl-cellulose, particulate alumina or urea. It is also possible to include one or more fillers in particular ceramics such as ceramic oxides and oxycompounds but possibly also metallic, intermetallic, semimetallic, polymeric and/or refractory materials including borides, carbides, nitrides, silicides, oxynitrides, and mixtures of all of the aforesaid materials.

The particulate carbonaceous materials making up the bulk of the material are preferably selected from petroleum coke, metallurgical coke, anthracite, graphite or any other form of crystalline carbon, amorphous carbon or a mixture thereof, preferably petroleum coke. Additionally, the carbon may be a fulerene such as fulerene $C_{60}$ or $C_{70}$ or of a related family. Mixtures of these different forms of carbon can also be used.

The size of the particulate carbonaceous material is usually below 40 mm, preferably between 1 micrometer and 30 mm, and the particulate carbonaceous material preferably contains between 5 weight % and 40 weight % of particles having a size below 0.2 mm.

To give best granulometery for optimum strength, the material of the invention is preferably made up from a mixture of several different grades of carbonaceous materials, e.g. of different sizes.

The material of the invention may contain particulate carbonaceous material, fillers or binders that are fibrous, both discrete (chopped) fibers and continuous or discontinuous lengths of fibers. Fibers have the advantage of enhancing bonding and improving toughness, hence the solidity of the resulting bodies or masses. Mixtures of powders and fibers are also contemplated.

The material can also be used to produce relatively thick fibers (1 to 5 mm diameter), both short fibers and continuous lengths. These pre-formed fibers may then be mixed into the starting mixture.

The material according to the invention can also be applied to pre-forms of carbonaceous materials, aluminium, alumina or other refractory materials, in the form of honeycombs, reticulated foams, fabrics, felts, etc. which serve as a core or as a reinforcement for the finished body.

The particulate starting material usually comprises 1 to 20 weight % particulate aluminium and 80 to 99 weight % of particulate carbonaceous material, and is mixed with the liquid carrier in an amount of 5 to 20 ml of the liquid carrier per 100 grams of the particulate starting material.

A particular advantage obtained by using the liquid carrier with the combination of a lithium compound and an aluminium compound is that this enables a considerable reduction in the amount of particulate aluminium used, thus reducing the cost of the material, without impeding the performance of the material, but to the contrary providing enhanced resistance to oxidation.

The aluminium used can be as particulates, chips, fibers, turnings or ground scrap pieces or whiskers. It is advantageous to use the so-called "wet grade" of aluminium powder obtained by milling aluminium in water, since this wet grade is much cheaper and is less dangerous because it is less reactive. The use of wet grades of powdered aluminium obtained by grinding waste aluminium foil is particularly advantageous for cost reasons, though dry grades may be used too. The aluminium particulate etc. can be mixed mechanically, or applied by various spraying methods including plasma and flame spraying of the powder.

The size of the aluminium particles is preferably 44 micrometer ($-325$ mesh) or less. The smaller the aluminium particle size, the less aluminium is needed for the same surface area.

The bodies of the invention may be prepared from a paste having different fluidities during its production, handling, storage and transport. Its viscosity may range from about $10^{-1}$ to $10^{15}$ cP, i.e. from quite fluid to solidified masses ready for use. For cost reasons, it is desirable to minimize the quantity of the liquid carrier. Therefore controlled viscous forms of the paste are usually preferred, i.e. with a viscosity in the range $10^1$ to $10^3$ cP.

When used as anode block, the side surfaces of the bodies may be coated with an even more oxidation-resistant coating, as described in copending application Ser. No. 07/897,726, or impregnated with a material improving its oxidation resistance. The carbon block may also contain alumina. As the anode is consumed in use, the aluminium carbide and/or oxycarbide it contains, as well as any alumina and any other aluminium compounds it contains, provides a high concentration of the material to be electrolyzed at locations where this is most important. In particular, the aluminium carbide and/or oxycarbide will be oxidized to alumina at the operative anode surface, e.g. by the reaction $Al_4C + 4O_2 \rightarrow 2Al_2O_3 + CO_2$. When the alumina in the electrolyte is depleted due to insufficient replenishment from an external supply, the alumina from the anode will serve to provide some additional alumina on the anode active surface and will serve to reduce the anode overvoltage.

The carbon-based material can be a self-sustaining generally rectangular block, or a paste of the material can be continually fed as it is used, in the manner of a Söderberg anode fed at a rate to compensate for carbon consumption.

A method according to the invention of producing a carbon body or mass for use in particular as anode for the electrolysis of alumina dissolved in a cryolite-based molten electrolyte, comprises forming the material of the invention to a desired shape and size, compacting and heat treating the material to form compounds such as aluminium oxycarbide and/or carbide.

The material may for example be compacted by pressing into the desired shape in a mold at a pressure between about 0.1 to 2 tons/cm$^2$ or may be compacted by vibration and/or the application of pressure in a mold or extrusion die of the desired shape and size.

Optionally, the mixture of particulate carbonaceous material and aluminium is mixed with a filler before mixing with the solution. If necessary, the carbonaceous material is dried before mixing with the fillers. Also, the paste formed by mixing with the solution can be partially dried before molding and compacting.

Before use, the body is subjected to heat treatment at a temperature up to about 800°–1100° C. or more.

After making a block or mass, the block or mass may be subjected to an impregnation with a colloid based slurry and heated again. It is also possible to coat the block or mass with a coating of desired composition. The coating may be a protective coating which further improves the resistance of the body to oxidation, and which may also enhance the bodies electrical conductivity and/or its electrochemical activity, such coating being applied from a colloidal slurry containing reactant or non-reactant substances, or a mixture of reactant and non-reactant substances, which when the body is heated to a sufficient elevated temperature react and/or sinter to form the protective coating. Such coatings are described in copending application Ser. No. 07/898 052 (now U.S. Pat. No. 5,364,513) the contents of which are incorporated herein by way of reference.

An electrolytic cell for the electrolysis of alumina for the production of aluminium according to the invention comprises an anode made of solidified carbon-based body as discussed above, or in the form of a paste which is continuously supplied at a rate corresponding to the consumption of the carbon, like a Söderberg type anode.

A further aspect of the invention is a mixture of carbonaceous materials as precursor for forming a carbon-based body for use in particular as anode of electrolytic cells for the electrolysis of alumina in cryolite-based molten electrolytes, consisting substantially of a mixture of one or more particulate carbonaceous material(s) with particulate aluminium and with at least one compound of aluminium, lithium, cerium, calcium and sodium (preferably at least one lithium-based compound mixed with at least one aluminium compound) in a liquid carrier, in the form of a paste or a dried mixture which upon heat treatment reacts to form a binder based on compounds of aluminium with carbon, oxygen and/or nitrogen or mixtures thereof, typically aluminium carbide and/or aluminium oxycarbide, with metallic aluminium.

The body, methods, cell and cell components according to the invention have numerous advantages stemming from the elimination of the pitch binder. For the production process, these advantages include:

1) Elimination of environmental problems and health hazards during manufacture, use and disposal.

2) Elimination of pitch and the associated drawbacks for the storage, transport and handling of pitch.

3) Economizing the cost of the pitch itself and of the installation for its storage and handling.

4) Elimination of the tar residues from the filters in the baking furnaces which are difficult and costly to dispose of.

5) Simplification of the plants which are used today, particularly by the elimination of the hot mixing and the high calcining temperature.

6) Possibility to utilize part of the plants existing today, with the advantage of drastically reducing the operating cost of existing plants and the investments required for new plants.

7) Elimination of the costly and lengthy calcining phase and the pollution deriving from the emission of PAH.

8) Reduction of the production cycle from 3 to 4 weeks to 1 to 3 days or less.

The resulting material also has numerous advantages in use as anode in an aluminium production cell, as follows:

9) The material is subject to much less oxidation than conventional carbon materials used as anodes, and it oxidizes much more uniformly than the conventional materials. Tests show a wear rate of about one tenth that of conventional pitch-based anodes.

10) Conventional anodes break and disintegrate due to the fact that sodium from cryolite attacks pitch faster than the pitch oxidizes, leading to disintegration. Elimination of the pitch reduces this phenomenon.

11) The overvoltage on the anode is reduced.

12) The material is wettable by cryolite, which improves its performance as anode because this wettability increases the surface at which mass transfer takes place leading to a reduction in the concentration polarization of $O_2$ and less overpotential.

13) There is less consumption of carbon due to reduced oxidation at the anode sides, and reduced disintegration in the operative anode areas. Use of the material as anodes thus leads to a great overall reduction in pollution.

14) The residual materials are also less toxic, reducing the problem of disposal of toxic waste in residual material.

15) Anode effects are reduced or eliminated, due to the fact that the material maintains a minimum concentration of $Al_2O_3$ at the interface.

DETAILED DESCRIPTION

Preparation of Carbon-Based Blocks with the New Binder

The preparation of carbon-based anode blocks with the new binder consists primarily of the following phases:

a) Preparation of dry mixtures of the required particle size of the carbonaceous materials : preferably petroleum coke.

b) Careful mixing of the carbonaceous material with the powdered aluminium and chosen, optional particulate fillers.

c) Preparation of the solution of the lithium compound such as lithium nitrate and the aluminium compound such as aluminium nitrate in the liquid carrier such as methyl cellulose, polyvinyl alcohol, colloidal alumina or water, with optional additives, such as boric acid and its salts and aluminium fluoride, to reduce and normalize oxidation. Additives which enhance bonding, such as methyl cellulose, or colloidal alumina are preferred.

d) Mixing of the powders with the solution until perfect mixing and homogenization.

e) Compacting to the desired shape and size by means of pressing, extrusion and/or vibration, or in generally rectangular molds to form blocks.

f) Drying in one or more steps, including possible partial drying before or during compacting, or drying of the poured paste to eliminate the excess of liquid.

g) Baking in a furnace, usually at a temperature in the range 800°–1100° C., usually for a time about ½ hour for small samples to several hours for bigger parts.

The method of preparation of the blocks is different from the traditional method utilized so far in as much as the binder is not made of pitch. Therefore, all operations for preparation of the mixtures, addition of the binder and compacting may be carried out at room temperature instead of that required by the melting point of pitch. Consequently, the calcining, that is usually carried out at above 1000° C. and for a total period of 2 to 4 weeks, can be replaced by a much shorter heat treatment.

The production process of carbon anode blocks for aluminium production applications comprises, stepwise: (1) drying of carbonaceous material, if necessary; (2) crushing of carbonaceous material in a crusher; (3) blending of carbonaceous material with aluminium powder and fillers in a blender; (4) optional mixing of carbonaceous material with aluminium powder, fillers and a lithium/aluminium compound solution in a mixer to form a fluid paste; (5) drying of the fluid paste in an oven; (6) molding of dried paste; and (7) other optional treatments. A detailed description of the production process follow. A supply of carbonaceous material is if necessary dried in a drier. Drying is necessary for metallurgical coke, but is not always necessary for petroleum coke and other grades of carbonaceous materials. If the carbonaceous material is not already supplied ground to the required particle size, it is crushed to the required size and screened in a crusher where it may be combined with scrap carbonaceous materials, coming from production scrap of compacted bodies, or from the re-processing of non-consumed parts of anodes or other cell components after use.

The carbonaceous material leaving the crusher is a dry, uniform particulate with particle size usually up to 40 mm, preferably between 1 micrometer and 30 mm, but may also be a mixture of several grades of carbonaceous materials of different sizes. This carbonaceous material is blended with aluminium powder and optional fillers in a blender which may be a separate unit, or may be combined with a mixer in which the carbonaceous material, aluminium and optional filler(s) and the lithium/aluminium compound solution with binders are mixed to form a homogenized fluid paste.

The particulate aluminium is advantageously wet grade particulate aluminium obtained by grinding scrap foil, and its size is preferably 44 micrometers (−325 mesh) or less.

As necessary, the paste-like material leaving the mixer is dried in an oven to bring it to the required viscosity for delivery to the mold. This mold may be a mold or injection die. This mold may be at the same location as the production units prior thereto, or it may be at a remote location, such as at the site of an aluminium production plant. In the latter case, the material in paste form is transported in tanks which can remain at ambient temperature.

After compacting and shaping in the mold, which may be combined with drying, the compacted body is dried as necessary and may be subjected to optional treatments. Such treatments include super drying or special heat treatments under an inert or a reducing atmosphere; impregnation of the compacted body with the same or a different colloidal binder, followed by heating; coating of the compacted body with a suitable coating on some or all of its surfaces; and securing current collectors and the like to the body by means of the traditional rodding process.

If the material is not subjected to heat treatment to convert the aluminium to aluminium compounds such as aluminium oxycarbide and/or aluminium carbide at the material production site, this heat treatment can be carried out at the site of use, possibly in-situ in an aluminium production cell in the case of a Söderberg-type anode.

The following examples further illustrate the invention.

EXAMPLE I

A solution was prepared by thoroughly mixing 5 g of $AlNO_3.9H_2O$ (98%) and 5 g of $LiNO_3$(99%) in 50 ml of water. Then, 6.3 g aluminum powder, 8.2 g petroleum coke powder (−6 to +12 mesh), 8.2 g petroleum coke powder (−12 to +80 mesh) and 8.2 g petroleum coke powder (about −48 mesh) were weighed and mixed together thoroughly. This powder mixture has a composition of 18 wt % aluminum powder and 27.3 wt % of each of the three grades of petroleum coke powders.

An amount of 3 ml of the solution was added to the powder mixture and stirred well. After drying to paste consistency, the mixture was pressed at 8000 psi pressure in a die of 1 inch (2.54 cm) diameter. In the pressing process, some liquid was squeezed out. Cylinders produced by this pressing operation all exhibited good formability: no signs of cracking or tendency to crumble. The resulting cylinder was immersed in carbon powder for ½ hour (to cover its surface and prevent oxidation during baking) then placed into a furnace at 1000° C. for about 15 minutes.

The cylinder was then removed from the furnace and allowed to cool in air. The baked cylinder had good strength.

EXAMPLE II

Example I was repeated with a powder mixture having a composition of 10 wt % aluminum powder and 30.0 wt % of each of the three grades of petroleum coke powders. The resulting baked cylinder also had good strength.

EXAMPLE III

Example II was repeated with the addition in the solution of 5 ml colloidal alumina, or with 5 ml of a 2% solution of methyl cellulose, or with 1 ml of polyvinyl alcohol.

In all cases, these additions were found to improve the green strength of the pressed body, before firing.

example IV (Testing in Cryolite)

Two different types of cryolite resistance test were performed on the materials prepared as in Examples I and II: an immersion test in a cryolite bath and a hanging cell test.

The cryolite bath test consisted in packing the sintered carbon-based cylinder in cryolite with 8 wt % alumina powder in a ceramic clay crucible, and placing the crucible into a furnace at 1000° C. The cryolite/alumina powder melted after several hours, then the carbon-based cylinder was held under the cryolite bath for another 3 to 6 hours.

For the hanging cell test, a hole was drilled in the sintered carbon-based cylinder to receive a high-temperature alloy for connection of the cylinder to a current source to function as anode. A commercial anthracite block was used as cathode using a laboratory scale aluminium production cell. Cryolite was mixed with 8 wt % of alumina as electrolyte. A constant current density of 0.8 $A/cm^2$ was applied after the cryolite had melted, and the test was continued for 3 hours.

The experimental results show that the material of the invention prepared as in Examples I and II can stand in the cryolite for 3 to 6 hours without any significant breakdown.

Comparative tests with standard carbon materials showed the strength of the new materials to be adequate. In electrochemical tests, the new materials showed a carbon consumption equivalent to the theoretically expected value. In addition, the part of the electrode above the cryolite showed little or no oxidation. The addition of the lithium compound decreased the overvoltage of $CO_2$ evolution.

EXAMPLE V (Oxidation Testing)

Oxidation tests were carried out with carbon-based materials prepared as in Examples I and II and standard commercial carbon anode materials. The tests were carried out by heating samples immersed in carbon powder at 950° C. and at 650° C. for various times and by heating samples in air at 580° C. and 500° C. for various times. The degree of oxidation of the samples was assessed by optical inspection and by the measured weight loss.

In the test conditions, the standard carbon samples all exhibited significant weight loss that was easily discernable, and in fact were usually fully consumed in about 3 hours. The specimens according to the invention exhibited a weight loss less than 1% of the original weight after 3 hours.

We claim:

1. A carbon containing body for use in cells for the electrolysis of alumina dissolved in a cryolite-based molten electrolyte, consisting essentially of:
   one or more compacted, non-pitch, particulate carbonaceous materials in a binder of at least one compound of aluminium with at least one element selected from the group consisting of carbon, oxygen and nitrogen and mixtures of at least one such compound with metallic aluminium; wherein the weight ratio of said binder to said particulate materials is less than 1; and
   wherein said compact is obtained by mixing said particulate carbonaceous materials with aluminum, and with at least one compound of lithium, aluminium, cerium, calcium and sodium in a liquid carrier, and compacting and heat treating such mixture to bond the carbonaceous materials with said binder.

2. The carbon-containing body of claim 1, in which the binder comprises at least one compound selected from the group consisting of aluminium carbide, aluminium oxycarbide, aluminium nitride and aluminium oxynitride and mixtures thereof with metallic aluminium.

3. The carbon containing body of claim 1, in which the starting mixture comprises an aluminium compound selected from the group consisting of aluminium nitrate, aluminium carbonate, aluminium halides, aluminium borate and aluminium carbide and mixtures thereof.

4. The carbon containing body of claim 1, in which the starting mixture comprises a lithium compound selected from the group consisting of lithium acetate, lithium carbonate, lithium fluoride, lithium chloride, lithium oxalate, lithium nitride, lithium nitrate, lithium formate and lithium aryl, lithium tetraborate and mixtures thereof.

5. The carbon containing body of claim 1, in which the liquid carrier comprises a binding agent selected from the group consisting of methyl cellulose, polyvinyl alcohol and colloids.

6. The carbon containing body of claim 5, in which the liquid carrier comprises a colloid of at least one compound selected from the group consisting of alumina, silica, yttria, ceria, thoria, zirconia, magnesia, lithia and hydroxides, acetates and formates thereof.

7. The carbon-containing body of claim 5 wherein said binding agent is colloidal aluminum.

8. The carbon containing body of claim 1, comprising one or more fillers selected from the group consisting of boric acid, salts of boric acid, fluorides of boric acid, methyl cellulose, particulate alumina, urea, metallic, intermetallic, semi-metallic, polymeric, refractory and ceramic materials.

9. The carbon containing body of claim 1, in which the particulate carbonaceous materials are selected from the group consisting of petroleum coke, metallurgical coke, anthracite, graphite, amorphous carbon, fulerene and a mixture thereof.

10. The carbon containing body of claim 9, in which the size of the particulate carbonaceous material is up to 40 mm not including zero.

11. The carbon-containing body of claim 10 wherein the size of the particulate carbonaceous material is between 1 micrometer and 30 millimeters.

12. The carbon containing body of claim 9, in which the particulate carbonaceous material contains between 5% and 40% of particles having a size below 0.2 mm.

13. The carbon containing body of claim 1, in which at least part of the particulate carbonaceous material and of an optional filler is fibrous.

14. The carbon containing body of claim 1, derived from a particulate starting material comprising 1 to 20 parts by weight of particulate aluminium and 80 to 99 parts by weight of particulate carbonaceous material.

15. The carbon containing body of claim 14, in which the particulate starting material is mixed with the compounds in the liquid carrier in an amount of 5 to 20 ml of the liquid carrier per 100 grams of the particulate starting material.

16. The carbon containing material of claim 14, in which the starting particulate aluminium has a dimension of at most 44 micrometer (−325 mesh).

17. The carbon containing material of claim 14, in which the starting particulate aluminium is wet milled aluminium derived from scrap foil.

18. The carbon containing body of claim 1, which is an anode of a cell for the production of aluminium by the electrolysis of alumina in a cryolite-containing molten electrolyte.

19. The anode-forming carbon containing body of claim 18, in which the anode body contains alumina.

20. The anode-forming carbon containing body of claim 18, in which the side surfaces of the anode body are coated with an oxidation-resistant material.

21. The anode-forming carbon containing body of claim 18, which comprises a solidified body joined to a current-connecting member by a solidified mass of the same material.

22. A carbon containing body or mass consisting essentially of: one or more compacted, non-pitch, particulate carbonaceous materials in a binder of at least one compound of aluminium with at least one element selected from the group consisting of carbon, oxygen and nitrogen and mixtures of at least one such compound with metallic aluminium;
wherein the weight ratio of said binder to said particulate materials is less than 1; and
wherein said body or mass is a compacted, dried mixture of said particulate carbonaceous material with aluminium and with at least one compound selected from the group consisting of aluminium, lithium, cerium, calcium and sodium in a liquid carrier.

23. The carbon containing body or mass of claim 22, in which the binder comprises at least one compound selected from the group consisting of aluminium carbide, aluminium oxycarbide, aluminium nitride and aluminium oxynitride and mixtures thereof with metallic aluminium.

24. The carbon containing body or mass of claim 22, in which the starting mixture comprises an aluminium compound selected from the group consisting of aluminium nitrate, aluminium carbonate, aluminium halides, aluminium borate, aluminium carbide and mixtures thereof.

25. The carbon containing body or mass of claim 22, in which the starting mixture comprises a lithium compound selected from the group consisting of lithium acetate, lithium carbonate, lithium fluoride, lithium chloride, lithium oxalate, lithium nitride, lithium nitrate, lithium formate, lithium aryl, tetraborate and mixtures thereof.

26. The carbon containing body or mass of claim 22, in which the liquid carrier comprises a binding agent selected from the group consisting of methyl cellulose, polyvinyl alcohol and colloidal suspensions.

27. The carbon containing body or mass of claim 26, in which the liquid carrier comprises a colloid of at least one compound selected from the group consisting of colloidal alumina, silica, yttria, ceria, thoria, magnesia, lithia and hydroxides, acetates and formates.

28. The carbon-containing body of claim 26 wherein said binding agent is colloidal aluminum.

29. The carbon containing body or mass of claim 22, in which the starting mixture comprises one or more fillers selected from the group consisting of boric acid, salts of boric acid, fluorides of boric acid, methyl-cellulose, particulate alumina, urea, metallic, intermetallic, semi-metallic, polymeric, refractory and ceramic materials.

30. The carbon containing body or mass of claim 22, in which the particulate carbonaceous materials are selected from the group consisting of petroleum coke, metallurgical coke, anthracite, graphite, amorphous carbon, fulerene and a mixture thereof.

31. The carbon containing body or mass of claim 30, in which the size of the particulate carbonaceous material is up to 40 mm not including zero.

32. The carbon-containing body of claim 31 wherein the size of the particulate carbonaceous material is between 1 micrometer and 30 millimeters. -

33. The carbon containing body or mass of claim 30, in which the particulate carbonaceous material contains between 5% and 40% of particles having a size below 0.2 mm.

34. The carbon containing body or mass of claim 30, in which at least part of the particulate carbonaceous material and of any optional fillers is fibrous.

35. The carbon containing body or mass of claim 22, derived from a particulate starting material comprising 1 to 20 weight % particulate aluminium and 80 to 99 weight % of particulate carbonaceous material.

36. The carbon containing body or mass of claim 22, in which the particulate starting material is mixed with the compounds in the liquid carrier in an amount of 5 to 20 ml of the liquid carrier per 100 grams of the particulate starting material.

37. The carbon containing body or mass of claim 22, in which the starting particulate aluminium has a dimension of at most 44 micrometer −325 mesh, not including zero.

38. The carbon containing body or mass of claim 22, in which the starting particulate aluminium is wet milled aluminium derived from scrap foil.

39. A method of producing a carbon-based body or mass for use in electrolytic cells for the production of aluminium by the electrolysis of alumina in a cryolite-based molten electrolyte, comprising the steps of:
mixing one or more particulate carbonaceous materials with particulate aluminium;
mixing said mixture of particulate materials with a liquid solution of at least one compound selected from the group consisting of compounds of aluminium, lithium, cerium, calcium and sodium, until said particulate-liquid mixture is homogenized;
compacting the mixture to a desired shape and size; and
heat treating said compact to form a binder of at least one compound of aluminium with at least one element selected from the group consisting of carbon, oxygen and nitrogen, and at least one such compound mixed with metallic aluminium.

40. The method of claim 39, in which the binder comprises at least one compound selected from the group consisting of aluminium carbide, aluminium oxycarbide, aluminium nitride and aluminium oxynitride and mixtures thereof with metallic aluminium.

41. The method of claim 39, in which the mixture is compacted by pressing into the desired shape in a mold at a pressure between 0.1 to 2 tons/cm².

42. The method of claim 39, in which the mixture is compacted by the application of pressure in a mold of the desired shape and size or in an extrusion die.

43. The method of claim 39, in which the particulate mixture is mixed with a filler before forming.

44. The method of claim 39, in which before use the body or mass is subjected to heat treatment at a temperature from 800° C. to 1100° C.

45. The method of claim 39, in which the mixture is formed into the shape of a rectangular block, compacted and dried in a mold and removed from the mold as a self-sustaining block.

46. The method of claim 39, in which the starting mixture comprises an aluminium compound selected from the group consisting of aluminium nitrate, aluminium carbonate, aluminium halides, aluminium borate, aluminium carbide and mixtures thereof.

47. The method of claim 39, in which the starting mixture comprises a lithium compound selected from the group consisting of lithium acetate, lithium carbonate, lithium fluoride, lithium chloride, lithium oxalate, lithium nitride, lithium nitrate, lithium formate, lithium aryl, lithium tetraborate and mixtures thereof.

48. The method of claim 39, in which the comprises a binding agent selected from the group consisting of methyl cellulose, polyvinyl alcohol and colloidal suspensions.

49. The method of claim 48, in which the liquid carrier comprises a colloid of at least one compound selected from the group consisting of silica, alumina, yttria, ceria, thoria, zirconia, magnesia, lithia and hydroxides, acetates and formates.

50. The carbon-containing body of claim 48 wherein said binding agent is colloidal aluminum.

51. The method of claim 39, comprising adding to the mixture one or more fillers selected from the group consisting of boric acid, salts of boric acid, fluorides of boric acid, methyl-cellulose, particulate alumina, urea, metallic, intermetallic, semi-metallic, polymeric, refractory and ceramic materials.

52. The method of claim 39, in which the particulate carbonaceous materials are selected from the group consisting of petroleum coke, metallurgical coke, anthracite, graphite, amorphous carbon, fulerene and a mixture thereof.

53. The method of claim 52, in which the size of the particulate carbonaceous material is up to 40 mm not including zero.

54. The carbon-containing body of claim 53 wherein the size of the particulate carbonaceous material is between 1 micrometer and 30 millimeters. -

55. The method of claim 52, in which the particulate carbonaceous material contains between 5% and 40% of particles having a size below 0.2 mm.

56. The method of claim 39, in which at least part of the particulate carbonaceous material and of any optional fillers is fibrous.

57. The method of claim 39, employing a particulate starting material comprising 1 to 20 weight % particulate aluminium and 80 to 99 weight % of particulate carbonaceous material.

58. The method of claim 39, in which the particulate starting material is mixed with the compounds in the liquid carrier in an amount of 5 to 20 ml of the liquid carrier per 100 grams of the particulate starting material.

59. The method of claim 39, in which the starting particulate aluminium has a dimension of at most 44 micrometer (−325 mesh).

60. The method of claim 39, in which the starting particulate aluminium is wet milled aluminium derived from scrap foil.

61. A carbon body for use as a component of electrolytic cells such as an anode for the production of aluminium by the electrolysis of alumina in a cryolite-based molten electrolyte consisting essentially of:

a compacted mixture of one or more non-pitch particulate carbonaceous materials with an aluminium carbide, aluminium oxycarbide or an aluminum carbide-aluminium oxycarbide mixture based binder;

wherein the weight ratio of said binder to said particulate materials is less than 1; and wherein said compact is obtained by mixing the particulate carbonaceous materials with particulate aluminium and with at least one lithium-based compound mixed with at least one aluminium compound in a liquid carrier, compacting and reacting to form said binder.

62. An electrolytic cell for the production of aluminium by the electrolysis of alumina in a cryolite-based molten electrolyte, comprising an anode made of a carbon containing material which consists essentially of:

one or more compacted, non-Ditch, particulate carbonaceous materials in a binder of at least one compound of aluminum with at least one element selected from the group consisting of carbon, oxygen and nitrogen, and mixtures of at least one such compound with metallic aluminium;

wherein the weight ratio of said binder to said particulate materials is less than 1; and wherein said compact is obtained by mixing a particulate carbonaceous material with aluminium and with at least one compound selected from the group consisting of aluminum, lithium, cerium, calcium and sodium in a liquid carrier, and compacting and heat treating such mixture to bond the carbonaceous materials with said binder.

63. The electrolytic cell of claim 62, in which the component is an anode block.

64. The electrolytic cell of claim 63, in which the anode block contains alumina.

65. The electrolytic cell of claim 63, in which side surfaces of the anode block are coated with an oxidation-resistant coating.

66. The electrolytic cell of claim 62, in which the cell component is a Söderberg anode formed of the material.

* * * * *

UNITED STATES PATENT AND TRADEMARK OFFICE
CERTIFICATE OF CORRECTION

PATENT NO. : 5,397,450

DATED : March 14, 1995

INVENTOR(S) : Sekhar et al.

It is certified that error appears in the above-indentified patent and that said Letters Patent is hereby corrected as shown below:

On the title page, item [75], delete "Jaminagesh" and insert therefor --Jainagesh--.
Claim 1, Col. 10, line 68 delete the word "aluminum" and insert --aluminium-- therefor.
Claim 25, Col. 12, line 49, insert --lithium-- between "aryl," and "tetraborate".
Claim 27, Col. 12, line 59, insert --thereof-- between "formates" and ".".
Claim 37, Col. 13, line 30, insert parentheses around "-325 mesh".
Claim 48, Col. 14, line 16, insert --liquid carrier-- between "the" and "comprises".
Claim 49, Col. 14, line 24, insert --thereof--between "formates" and ".".
Claim 53, Col. 14, line 41, delete "carbon containing body" and insert therefor --method--.
Claim 56, Col. 16, line 7, please insert --of elements-- between "compound" and "selected".

Signed and Sealed this

Seventeenth Day of October, 1995

Attest:

BRUCE LEHMAN

*Attesting Officer*  *Commissioner of Patents and Trademarks*